United States Patent
Mastrocola et al.

(10) Patent No.: US 11,267,580 B2
(45) Date of Patent: Mar. 8, 2022

(54) FUEL SYSTEMS FOR AIRCRAFT AND METHODS OF PRESSURIZING FUEL

(71) Applicant: Hamilton Sundstrand Corporation, Charlotte, NC (US)

(72) Inventors: Naison E. Mastrocola, Goshen, CT (US); John M. Kassel, Huntley, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 444 days.

(21) Appl. No.: 16/225,421

(22) Filed: Dec. 19, 2018

(65) Prior Publication Data
US 2020/0198799 A1    Jun. 25, 2020

(51) Int. Cl.
*B64D 37/10* (2006.01)
*B64D 37/04* (2006.01)

(52) U.S. Cl.
CPC ............. *B64D 37/10* (2013.01); *B64D 37/04* (2013.01)

(58) Field of Classification Search
CPC ........ B64D 37/04; B64D 35/00; B64D 35/08; B64D 37/10; F02C 9/263; F02C 7/224; F02C 7/236
See application file for complete search history.

(56) References Cited

U.S. PATENT DOCUMENTS

| | | | |
|---|---|---|---|
| 2003/0074884 A1* | 4/2003 | Snow | F02K 1/17 60/204 |
| 2013/0192679 A1* | 8/2013 | Ripley | F02M 37/0052 137/2 |
| 2014/0290266 A1 | 10/2014 | Veilleux, Jr. et al. | |
| 2015/0344143 A1* | 12/2015 | Epstein | B64D 37/30 244/135 C |
| 2016/0230669 A1* | 8/2016 | Selstad | F02C 7/224 |
| 2018/0135772 A1* | 5/2018 | Gundlach | B64D 37/005 |

FOREIGN PATENT DOCUMENTS

WO    92/07179 A1    4/1992

OTHER PUBLICATIONS

Extended European Search Report dated Apr. 29, 2020, issued during the prosecution of European Patent Application No. EP 19214714.8.

* cited by examiner

*Primary Examiner* — Joshua J Michener
*Assistant Examiner* — Cindi M Curry
(74) *Attorney, Agent, or Firm* — Locke Lord LLP; Daniel J. Fiorello; Gabrielle L. Gelozin

(57) ABSTRACT

A fuel system for an aircraft can include one or more airframe fuel lines configured to transfer fuel from one or more fuel tanks to an engine, one or more engine fuel pumps in fluid communication with the one or more airframe fuel lines and configured to pressurize fuel from a main stage boost pressure to a combustor pressure to be injected into a combustor of an engine, one or more airframe fuel pumps configured to pressurize fuel within the one or more airframe fuel lines to the main stage boost pressure used by the engine fuel pump. For example, the main stage boost pressure can be about 250 psi.

16 Claims, 2 Drawing Sheets

FUEL SYSTEMS FOR AIRCRAFT AND METHODS OF PRESSURIZING FUEL

BACKGROUND

1. Field

This disclosure relates to fuel systems for aircraft.

2. Description of Related Art

Existing airframe level fuel systems have been designed without the engine in the design space. As a result, existing systems are designed to include low pressure airframe level fuel pumping, which requires a boost pump and a main stage gear pump for each engine.

Such conventional methods and systems have generally been considered satisfactory for their intended purpose. However, there is still a need in the art for improved fuel systems. The present disclosure provides a solution for this need.

SUMMARY

A fuel system for an aircraft can include one or more airframe fuel lines configured to transfer fuel from one or more fuel tanks to an engine, one or more engine fuel pumps in fluid communication with the one or more airframe fuel lines and configured to pressurize fuel from a main stage boost pressure to a combustor pressure to be injected into a combustor of an engine, one or more airframe fuel pumps configured to pressurize fuel within the one or more airframe fuel lines to the main stage boost pressure used by the engine fuel pump. For example, the main stage boost pressure can be about 250 psi. Each airframe fuel pump can be a three phase DC electric variable speed pump, for example.

The one or more engine fuel pumps can be a centrifugal pump mechanically connected to the engine to be driven by the engine. In at least some embodiments, there may be no engine boost pump upstream of the one or more engine fuel pumps (e.g., because boost pressure is already supplied by the one or more airframe fuel pumps).

The system can include at least one engine fuel filter downstream of the one or more engine fuel pumps. In certain embodiments, there is no engine fuel filter upstream of the one or more engine fuel pumps (e.g., because certain pumps, e.g., centrifugal pumps, do not need certain filtering upstream unlike gear pumps).

The at least one engine fuel filter can be in fluid communication with a main flow line to the combustor. The at least one engine fuel filter can also be in fluid communication with a high pressure actuation system.

The system can include a return-to-tank line in fluid communication with and downstream of the high pressure actuation system. The return-to-tank line can be fluid communication with one or more fuel tanks.

In certain embodiments, the system can include an engine heat exchanger disposed between the airframe fuel pump and the engine fuel pump. The engine heat exchanger can be selectively connected to the return-to-tank line to selectively dump fuel to the tank.

The system can include a plurality of fuel tanks. The one or more airframe fuel lines can connect to the plurality of fuel tanks. The one or more airframe fuel lines can connect to a plurality of engines, for example. The system can include one or more engine cross-feed valves disposed in the one or more airframe fuel lines and configured to selectively allow cross-feeding of fuel between the plurality of engines and/or fuel tanks.

A method can include pressurizing fuel in an airframe fuel line to a main stage boost pressure using one or more airframe fuel pumps (e.g., as described above) and providing the main stage boost pressure in the airframe fuel line to an engine fuel pump (e.g., as described above) such that an engine boost pump is not used, wherein the main stage boost pump is configured to pressurize fuel from the main stage boost pressure to a combustor pressure to be injected into a combustor of an engine. Any suitable methods and/or portions thereof are contemplated herein.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
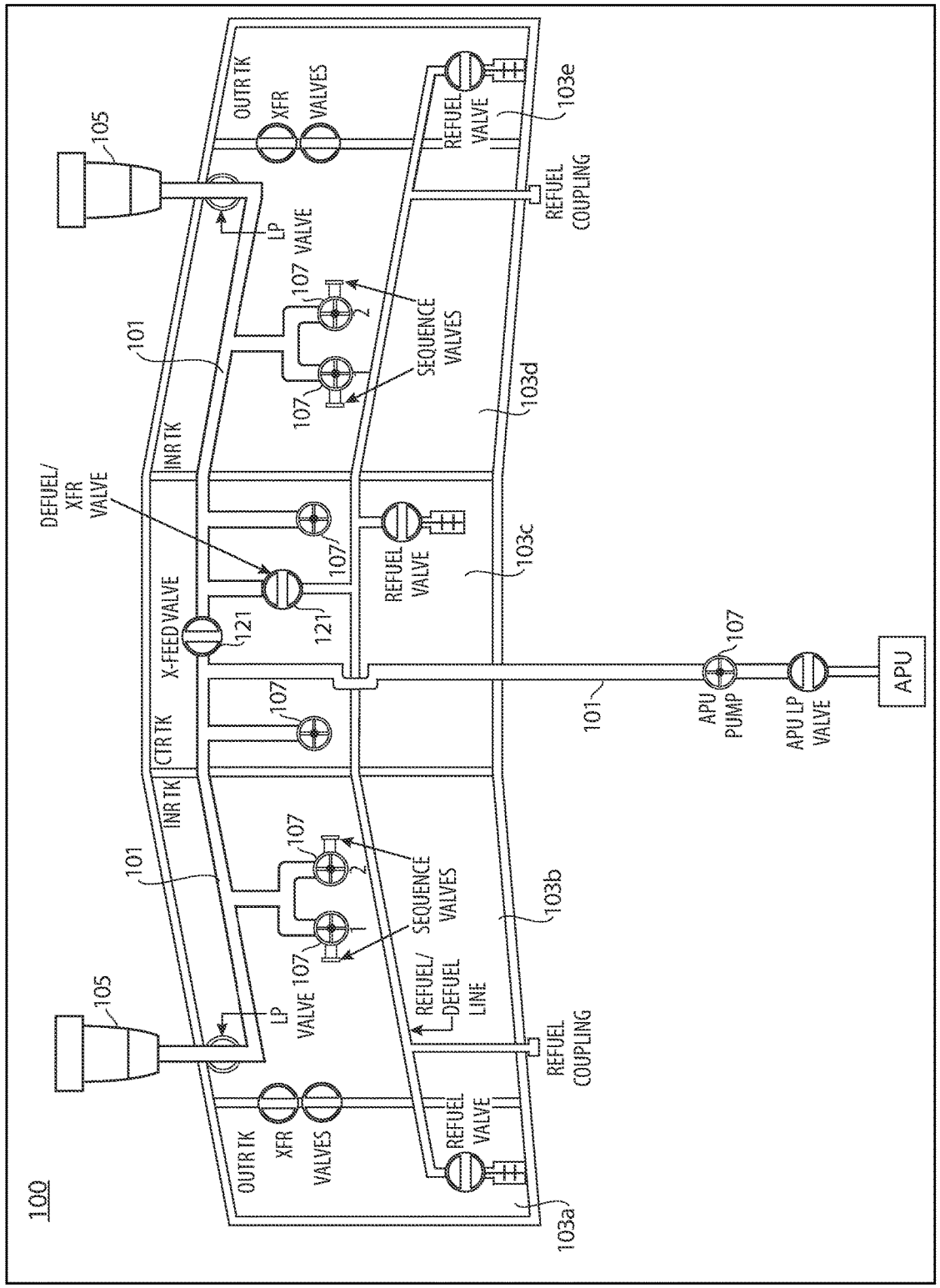
FIG. 1 is a schematic diagram of an embodiment of a system in accordance with this disclosure, showing airframe level architecture.
Figure 2:
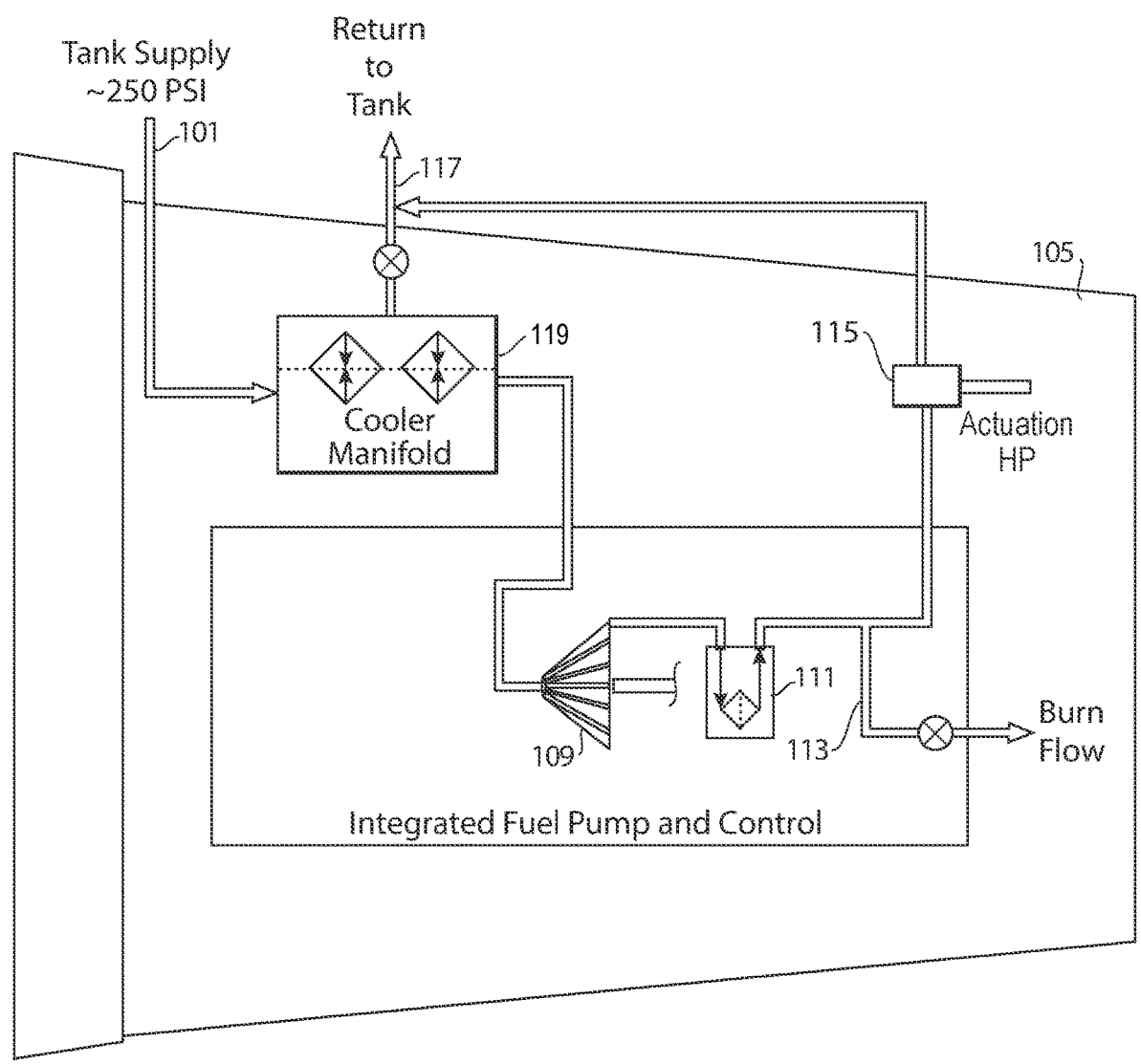
FIG. 2 is a schematic diagram of an embodiment of engine level architecture of the system of FIG. 1.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIG. 2. Certain embodiments described herein can be used to reduce complexity and weight of fuel systems while also improving reliability and fuel efficiency.

Referring to FIG. 1, a fuel system 100 for an aircraft can include one or more airframe fuel lines 101 (e.g., at the airframe level) configured to transfer fuel from one or more fuel tanks 103a, b, c, d, e to an engine 105. Referring additionally to FIG. 2, the system 100 can include one or more engine fuel pumps 109 (e.g., at the engine level) in fluid communication with the one or more airframe fuel lines 101 and configured to pressurize fuel from a main stage boost pressure to a combustor pressure to be injected into a combustor of an engine 105 (e.g., as shown in FIG. 2).

The system 100 can include one or more airframe fuel pumps 107 configured to pressurize fuel within the one or more airframe fuel lines 101 to the main stage boost pressure used by (e.g., required by) the one or more engine fuel pumps 109. For example, the main stage boost pressure can be about 250 psi (e.g., an order of magnitude greater than traditional airframe fuel systems). In certain embodiments, each airframe fuel pump 107 can be a three phase DC electric variable speed pump, for example. Any other suitable pump type is contemplated herein.

The one or more engine fuel pumps 109 can be a centrifugal pump mechanically connected to the engine 105 to be driven by the engine 105, for example. Any suitable pump type can be used for the one or more engine fuel pumps 109 (e.g., a gear pump). The one or more engine fuel pumps 109 can be driven in any suitable manner (e.g., via an electric motor, or mechanically connected to the engine). In at least some embodiments, there may be no engine boost pump upstream of the one or more engine fuel pumps 109 (e.g., because boost pressure is already supplied by the one or more airframe fuel pumps). Traditional systems require an engine driven boost pump upstream of the main pump to provide sufficient pressure to the main pump, and the main pump is traditionally a positive displacement pump which can be reduced to, e.g., a single centrifugal pump in accordance with this disclosure.

In certain embodiments, the engine fuel pump 109 can be sized for cruise reducing the amount of recycled flow and reducing waste heat addition to the fuel during cruise. Traditional engine fuel pumps are sized for start and windmill conditions, which is larger than needed for most operations which causes fuel recirculation in cruise and adds waste heat to fuel.

The system 100 can include at least one engine fuel filter 111 downstream of the one or more engine fuel pumps 109. In certain embodiments, there is no engine fuel filter upstream of the one or more engine fuel pumps (e.g., because certain pumps, e.g., centrifugal pumps, do not need certain filtering upstream unlike gear pumps). Traditionally, a main fuel pump (e.g. one or more engine fuel pumps 109) is a positive displacement pump for reliability, but requires upstream filtering. In certain embodiments, upstream filtration can be utilized, e.g., where filtration requirements drive a large filter canister that ends up big and heavy because of the high pressure containment requirement.

The at least one engine fuel filter 111 can be in fluid communication with a main flow line 113 to the combustor. The at least one engine fuel filter 111 can also be in fluid communication with a high pressure actuation system 115, e.g., as shown such that high pressure fuel from the one or more engine fuel pumps 109 is provided to the high pressure actuation system 115 through the fuel filter 111. High pressure actuation system 115 can be used for any suitable actuation on the aircraft as appreciated by those having ordinary skill in the art.

The system 100 can include a return-to-tank line 117 in fluid communication with and downstream of the high pressure actuation system 115. The return-to-tank line 117 can be fluid communication with one or more fuel tanks 103a, b, c, d, e.

In certain embodiments, the system 100 can include an engine heat exchanger 119 (e.g., a fuel-oil cooler) disposed between the airframe fuel pump 107 and the one or more engine fuel pumps 109. The engine heat exchanger can be selectively connected (e.g., via a suitable valve) to the return-to-tank line 117 to selectively dump fuel to the tank 103a, b, c, d, e.

As shown, the system 100 can include a plurality of fuel tanks 103a, b, c, d, e. The one or more airframe fuel lines 101 can connect to the plurality of fuel tanks 103a, b, c, d, e. The one or more airframe fuel lines 101 can connect to a plurality of engines 105, for example, e.g., as shown. The system 100 can include one or more engine cross-feed valves 121 (e.g., as shown in FIG. 1) disposed in the one or more airframe fuel lines 101 and configured to selectively allow cross-feeding of fuel between the plurality of engines 105 and/or fuel tanks 103a, b, c, d, e.

The system 100 can include any other suitable valve(s), pump(s), and/or flow architecture (e.g., as shown in FIG. 1) as appreciated by those having ordinary skill in the art. Any suitable number of airframe pumps (e.g., one at each low pressure (LP) valve, one at the APU, one for each tank) and/or placement thereof is contemplated herein.

A method can include pressurizing fuel in an airframe fuel line to a main stage boost pressure using one or more airframe fuel pumps (e.g., 107 as described above) and providing the main stage boost pressure in the airframe fuel line to an engine fuel pump (e.g., 109 as described above) such that an engine boost pump is not used. The main stage boost pump can be configured to pressurize fuel from the main stage boost pressure to a combustor pressure to be injected into a combustor of an engine. Any suitable methods and/or portions thereof are contemplated herein.

Embodiments provide higher pressure (e.g., main stage boost pressure that is higher by an order of magnitude than traditional airframe fuel pressure) outside of the engine architecture that is configured to provide fill pressure to the main stage pump to prevent pump wear or performance degradation (e.g., due to cavitation or other pressure related issues).

Embodiments can supply reliable airframe supply pressure and can include a single main pump that can be a centrifugal pump due to reliable airframe supply pressure. Such a pump is more efficient and doesn't need filter upstream due to particulate requirements of traditional positive displacement pumps. Further, embodiments can use three phase DC variable speed pumps (e.g., to provide less pressure for low pressure applications when desired). Any other suitable electric motor type is contemplated herein.

Embodiments utilize a common pressure rail that begins at the tank high voltage DC variable speed pump and is elevated in pressure to allow for engine start across the operational envelop. Embodiments allows for the main fuel pump to be decoupled from the start condition and be optimized for cruise. Embodiments reduce overall aircraft weight and decreases fuel burn due to increase fuel system efficiency.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:
1. A fuel system for an aircraft, comprising:
one or more airframe fuel lines configured to transfer fuel from one or more fuel tanks to an engine;
one or more engine fuel pumps in fluid communication with the one or more airframe fuel lines configured to pressurize fuel from a boost pressure to a combustor pressure to be injected into a combustor of the engine; and one or more airframe fuel pumps configured to pressurize fuel within the one or more airframe fuel lines to the boost pressure, wherein the boost pressure is between 200-300 psi, wherein there is no engine boost pump upstream of the one or more engine fuel pumps.

2. The fuel system of claim 1, wherein the one or more engine fuel pumps include a centrifugal pump mechanically connected to the engine to be driven by the engine.

3. The system of claim 1, further comprising at least one engine fuel filter downstream of the one or more engine fuel pumps.

4. The system of claim 3, wherein there is no engine fuel filter upstream of the one or more engine fuel pumps.

5. The system of claim 4, wherein the at least one engine fuel filter is in fluid communication with a main flow line to the combustor.

6. The system of claim 5, wherein the at least one engine fuel filter is in fluid communication with a high pressure actuation system.

7. The system of claim 6, further comprising a return-to-tank line in fluid communication with and downstream of the high pressure actuation system.

8. The system of claim 7, further comprising an engine heat exchanger disposed between the airframe fuel pump and the engine main fuel pump.

9. The system of claim 8, wherein the engine heat exchanger is selectively connected to the return-to-tank line to selectively dump fuel to the tank.

10. The system of claim 1, further comprising a plurality of fuel tanks, wherein the one or more airframe fuel lines connect the plurality of fuel tanks.

11. The system of claim 10, wherein the engine includes a plurality of engines, wherein the one or more airframe fuel lines connect to the plurality of engines.

12. The system of claim 11, further comprising one or more engine cross-feed valves disposed in the one or more airframe fuel lines and configured to selectively allow cross-feeding of fuel between the plurality of engines and/or fuel tanks.

13. The system of claim 1, wherein each airframe fuel pump of the one or more airframe fuel pumps is a three phase DC electric variable speed pump.

14. A method, comprising:

pressurizing fuel in an airframe fuel line to a boost pressure using one or more airframe fuel pumps, wherein the boost pressure is about 250 psi; and providing the boost pressure in the airframe fuel line to an engine fuel pump such that an engine boost pump is not used, wherein the engine fuel pump is configured to pressurize fuel from the boost pressure to a combustor pressure to be injected into a combustor of an engine.

15. The method of claim 14, wherein each airframe fuel pump of the one or more airframe fuel pumps is a three phase DC electric variable speed pump.

16. The method of claim 15, wherein the engine fuel pump is a centrifugal pump mechanically connected to the engine.

* * * * *